(12) United States Patent
Inagaki et al.

(10) Patent No.: US 8,545,648 B2
(45) Date of Patent: Oct. 1, 2013

(54) METHOD FOR PRODUCING HEAT INSULATING LAMINATE STRUCTURE, HEAT INSULATING LAMINATE STRUCTURE, AND TRANSPARENT LAMINATE FILM FOR THE SAME

(75) Inventors: Hiroki Inagaki, Komaki (JP); Tetsuya Takeuchi, Komaki (JP); Tetsuji Narasaki, Komaki (JP); Masataka Inuzuka, Komaki (JP); Osamu Goto, Kitanagoya (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 0 days.

(21) Appl. No.: 13/598,036

(22) Filed: Aug. 29, 2012

(65) Prior Publication Data
US 2013/0004727 A1 Jan. 3, 2013

Related U.S. Application Data

(63) Continuation of application No. PCT/JP2012/050580, filed on Jan. 13, 2012.

(30) Foreign Application Priority Data

Feb. 14, 2011 (JP) .................. 2011-028322

(51) Int. Cl.
*B29C 71/00* (2006.01)

(52) U.S. Cl.
USPC .... 156/60; 156/272.2; 156/272.8; 156/273.3; 428/457; 428/469; 428/472.1; 428/701; 428/156; 428/172

(58) Field of Classification Search
USPC .......... 156/60, 272.2, 272.8, 273.3; 428/156, 428/172, 457, 469, 472.1, 701
See application file for complete search history.

(56) References Cited

U.S. PATENT DOCUMENTS

| 6,395,398 | B1 | 5/2002 | Nakashima et al. |
| 2002/0071934 | A1* | 6/2002 | Marutsuka .................... 428/131 |
| 2002/0142149 | A1 | 10/2002 | Nakashima et al. |
| 2009/0090462 | A1* | 4/2009 | Kato et al. ..................... 156/249 |
| 2009/0197098 | A1* | 8/2009 | Polcyn et al. ................. 428/432 |
| 2010/0195197 | A1 | 8/2010 | Usami |

FOREIGN PATENT DOCUMENTS

| JP | 5-70178 | 3/1993 |
| JP | 7-242441 | 9/1995 |

(Continued)

OTHER PUBLICATIONS

Search report from International Application No. PCT/JP2012/050580, mail date is Mar. 27, 2012.

*Primary Examiner* — Richard Crispino
*Assistant Examiner* — Elizabeth Royston
(74) *Attorney, Agent, or Firm* — Greenblum & Bernstein, P.L.C.

(57) ABSTRACT

Disclosed is a method for producing a heat insulating laminate structure having an excellent solar radiation shielding capability as well as an excellent radio wave transparency. The method includes placing a transparent laminate film between two transparent substrates, the transparent laminate film having on at least one side of a transparent polymer film a laminated layer structure in which a metal oxide layer containing an organic component and a metal layer are laminated and grooves having widths of 30 μm or less are formed with dividing the metal layer; bonding the two substrates to each other through the transparent laminate film under application of a pressure; and promoting division of the metal layer in the transparent laminate film by the applied pressure to increase an overall surface resistance.

11 Claims, 3 Drawing Sheets

(56) References Cited

FOREIGN PATENT DOCUMENTS

| | | |
|---|---|---|
| JP | 8-28592 | 3/1996 |
| JP | 2001-26071 | 1/2001 |
| JP | 2005-104793 | 4/2005 |
| JP | 2005-353656 | 12/2005 |
| JP | 2010-202497 | 9/2010 |
| WO | 2011/024756 | 3/2011 |

* cited by examiner

METHOD FOR PRODUCING HEAT INSULATING LAMINATE STRUCTURE, HEAT INSULATING LAMINATE STRUCTURE, AND TRANSPARENT LAMINATE FILM FOR THE SAME

CLAIM FOR PRIORITY

This application is a continuation of PCT/JP2012/050580 filed Jan. 13, 2012, and claims the priority benefit of Japanese Application No. 2011-028322, filed Feb. 14, 2011, the contents of which is expressly incorporated by reference in its entirety.

TECHNICAL FIELD

The present invention relates to a method for producing a heat insulating laminate structure that can be suitably used as a window glass of an architectural structure such as a building and a house or a window glass of a vehicle such as an automobile, the heat insulating laminate structure, and a transparent laminate film for the laminate structure.

BACKGROUND ART

Conventionally, as a solar radiation shielding film, a heat ray cutting film is known. As an example of the heat ray cutting film, PTL1 discloses a transparent laminate film of a multilayer film type in which metal oxide layers and metal layers are alternately laminated on one side of a transparent polymer film.

Further, in PTL2, a technology is disclosed in which, in a heat ray reflecting glass formed by laminating a film having a high heat ray reflectance on a glass substrate, the film has a surface resistance of 500Ω/□ or less, a dividing groove is formed on the film, and a solar radiation transmittance of the film is 50% or less. In PTL2, it is described that, although the film allows radio waves to pass with the groove having a width of about 50 μm, the heat insulating film becomes an electrically continuous body when the groove width is too small, because an electrical current jumps over a gap of the groove by a displacement current.

Further, PTL3 discloses a laminate structure that is obtained by placing between two transparent substrates a thermoplastic resin film having a conductive film on a rough surface thereof and then by bonding the substrates and the film to each other.

CITATION LIST

Patent Literature

PTL1: JP 2005-353656 A
PTL2: JP Hei8-28592 B
PTL3: JP 2005-104793 A

SUMMARY OF INVENTION

Technical Problem

In order to shielding solar radiation in an architectural structure such as a building and a house or a vehicle such as an automobile, a window glass is used that comprises a heat ray cutting film placed between two glass substrates. In this case, the heat ray cutting film is required to have a visible light transparency and a solar radiation shielding capability as fundamental functions.

Further, in the case of window glasses for an architectural structure such as a building and a house, transparency to high-frequency radio waves having frequencies of several hundred MHz or more is required for use of mobile phones and a televisions. In the case of a window glass for an automobile, as ETC systems are in widespread use, radio wave transparency is required so as not to hinder radio wave reception of an in-vehicle ETC equipment.

However, the transparent laminate film disclosed in PTL1 has a poor radio wave transparency because the metal layers are continuous. Further, in the technology of PTL2, since the dividing groove formed on the film has a wide width of 50 μm or more, the dividing grooves are noticeable so that the film may have a poor appearance. Further, in the case of the laminate structure disclosed in PTL3, the rough surface is deformed and flattened on bonding of the thermoplastic resin film to the transparent substrates so that the structure may hardly have an expected radio wave transparency.

An object of the present invention is to provide a method for producing a heat insulating laminate structure excellent in radio wave transparency as well as in solar radiation shielding capability and to provide the heat insulating laminate structure. Another object of the present invention is to provide a transparent laminate film for a laminate structure suitably used for the laminate structure.

Solution to Problem

In order to solve the problem, the method for producing a heat insulating laminate structure according to a preferred embodiment of the present invention comprises placing a transparent laminate film between two transparent substrates, the transparent laminate film having on at least one side of a transparent polymer film a laminated layer structure in which a metal oxide layer containing an organic component and a metal layer are laminated and grooves having widths of 30 μm or less are formed with dividing the metal layer; bonding the two substrates to each other through the transparent laminate film under application of a pressure; and promoting division of the metal layer in the transparent laminate film by the applied pressure to increase an overall surface resistance.

Formation of the grooves is performed preferably by causing a starting material for formation of the metal oxide layer containing the organic component to react and by forming cracks due to a stress generated in the laminated layer structure during the reaction.

The organic component is preferably a remaining component of a starting material for a sol-gel method, and the formation of the grooves preferably comprises a step of applying energy to the laminated layer structure from a surface thereof in an atmosphere containing one or more species selected from oxygen, ozone, and water.

The formation of the grooves is performed preferably by subjecting a surface of the laminated layer structure to a laser processing.

The formation of the grooves is performed preferably by stretching of the transparent laminate film. In this case, the stretching is preferably biaxial stretching.

Formation of the grooves is performed preferably by formation of the laminated layer structure on at least one side of the transparent polymer film through an easy adhesion layer.

The metal oxide layer containing the organic component is formed preferably by a sol-gel method in which light energy is used during a sol-gel curing reaction.

It is preferable that a barrier layer composed mainly of a metal oxide is formed on at least one side of the metal layer. In this case, the barrier layer is preferably composed mainly of titanium oxide. Further, it is preferable that the barrier layer is a layer formed by post-oxidization of a metallic titanium layer or a layer formed by post-oxidization of a partially oxidized titanium layer.

The metal oxide layer is preferably a titanium oxide layer, and the metal layer is preferably a silver layer or a silver alloy layer.

In another aspect of the present invention, a heat insulating laminate structure according to a preferred embodiment of the present invention is produced by the method described above.

Yet, in another aspect of the present invention, a heat insulating laminate structure according to a preferred embodiment of the present invention comprises a transparent laminate film placed between two transparent substrates, the transparent laminate film having on at least one side of a transparent polymer film a laminated layer structure in which a metal oxide layer containing an organic component and a metal layer are laminated and grooves having widths of 30 μm or less are formed with dividing the metal layer. The two substrates are bonded to each other through the transparent laminate film under application of a pressure, and a whole surface resistance of the laminate layer structure is set at 500Ω/□ or more by promotion of division of the metal layer in the transparent laminate film by the applied pressure.

Yet, in another aspect of the present invention, a transparent laminate film for a laminate structure according to a preferred embodiment of the present invention is placed between two transparent substrates, the film has, on at least one side of a transparent polymer film, a laminated layer structure in which a metal oxide layer containing an organic component and a metal layer are laminated, grooves having widths of 30 μm or less are formed with dividing the metal layer, and a surface resistance of the transparent laminate film is 10Ω/□ or more.

Advantageous Effects of Invention

In the method for producing a heat insulating laminate structure according to the preferred embodiment of the present invention, a transparent laminate film is placed between two transparent substrates, the two substrates are bonded to each other through the transparent laminate film under application of a pressure, and division of the metal layer in the transparent laminate film is promoted by the applied pressure to increase an overall surface resistance. Since the method comprises these processes, a heat insulating laminate structure is obtained that has an excellent radio wave transparency as well as an excellent solar radiation shielding capability. Further, the obtained laminate structure has an excellent visible light transparency, and the grooves in the laminate structure are hardly visible so that the laminate structure has an excellent appearance.

When formation of the grooves is performed by causing starting material for formation of the metal oxide layer containing the organic component to react and by forming cracks due to a stress generated in the laminated layer structure during the reaction, numerous cracks are formed as the grooves in the laminated layer structure. Therefore, directionality in the surface resistance is unlikely to appear, and a transparent laminate film having an excellent uniformity in the surface resistance is obtained. In addition, since the cracks can be introduced in a relatively short period, the film has an excellent mass productivity.

When the organic component is a remaining component of a starting material of a sol-gel method and the formation of the grooves comprises a step of applying energy to the laminated layer structure from the surface thereof in an atmosphere containing one or more species selected from oxygen, ozone, and water, the one or more species promotes a sol-gel reaction of the starting material, so that formation of the cracks is induced in the metal oxide layer by cure shrinkage, and, starting from these cracks, the cracks are propagated into the laminated layer structure. Therefore, hardly visible cracks can be introduced into the laminated layer structure in a relatively simple manner, and a predetermined surface resistance can be obtained.

When the grooves are formed by a laser processing, the grooves can be formed in any desired form such as lattice-like, strip-like, and slit-like forms.

When the formation of the grooves is performed by stretching of the transparent laminate film, hardly visible cracks are introduced into the laminated layer structure in a relatively simple manner, and a predetermined surface resistance can be obtained. In particular, when the stretching is biaxial stretching, non-directional cracks are easily formed. Therefore, directionality in the surface resistance is unlikely to appear, and a transparent laminate film having an excellent uniformity in the surface resistance is obtained.

When the formation of the grooves is performed by formation of the laminated layer structure on at least one side of the transparent polymer film through an easy adhesion layer, the continuity of the metal layer is broken due to the cracks simultaneously with the formation of the laminated layer structure, and thus a groove formation process after a lamination process can be omitted. Therefore, the transparent laminate film has an excellent mass productivity, which contributes to cost reduction.

When the metal oxide layer in the transparent laminate film containing the organic component is formed by a sol-gel method in which light energy is used during a sol-gel curing reaction, the grooves are easily formed by the stress generated in the laminated layer structure during the reaction.

When a barrier layer composed mainly of a metal oxide is formed on at least one side of the metal layer, diffusion of metal elements constituting the metal layer due to solar radiation is likely to be inhibited. Therefore, the solar radiation shielding capability and radio wave transparency of the laminated structure are likely to be maintained for a long period of time, which contributes to improved durability and reliability of the laminate structure.

Particularly when the barrier layer is composed mainly of a titanium oxide, diffusion of the elements constituting the metal layer such as silver due to solar radiation or heat is likely to be inhibited. Further, when the barrier layer is a layer formed by post-oxidization of a metallic Ti layer or a layer formed by post-oxidization of a partially oxidized titanium layer, adsorbed water and oxygen contained in the laminated layer structure are consumed during the post-oxidation. Therefore, even when the laminate structure is exposed to sunlight, shape change of the metal oxide layer containing the organic component is inhibited, and peeling of the laminated layer structure hardly occurs, which results in improved durability of the laminate structure against solar radiation.

When the metal oxide layer is a titanium oxide layer, a relatively high refractive index is likely to be obtained. Therefore, the visible light transparency of the laminate structure is likely to be improved. Further, when the metal layer is a silver layer or a silver alloy layer, the layer provides an excellent balance between the visible light transparency and the solar radiation shielding capability.

Meanwhile, since the laminate structure according to the preferred embodiment of the present invention is produced by the above mentioned method, the laminate structure has an excellent radio wave transparency as well as an excellent solar radiation shielding capability.

Meanwhile, the laminate structure according to the preferred embodiment of the present invention comprises a transparent laminate film placed between two transparent substrates, the transparent laminate film having on at least one side of a transparent polymer film a laminated layer structure in which a metal oxide layer containing an organic component and a metal layer are laminated and grooves having widths of 30 μm or less are formed with dividing the metal layer, wherein the two substrates are bonded to each other through the transparent laminate film under application of a pressure, and a whole surface resistance of the laminate structure is set at 500Ω/□ or more by promotion of division of the metal layer in the transparent laminate film by the applied pressure, whereby the laminate structure has an excellent radio wave transparency as well as an excellent solar radiation shielding capability.

Meanwhile, the transparent laminate film for a laminate structure according to a preferred embodiment of the present invention has, on at least one side of a transparent polymer film, a laminated layer structure in which a metal oxide layer containing an organic component and a metal layer are laminated, grooves having widths of 30 μm or less are formed with dividing the metal layer, and a surface resistance of the transparent laminate film is 10Ω/□ or more. Thereby, when the transparent laminate film is placed between two transparent substrates and the two transparent substrates are bonded to each other under application of a pressure, division of the metal layer is promoted by the applied pressure. Thus, a heat insulating laminate structure is obtained that has an overall surface resistance increased to a level that provides a practical radio wave transparency. Therefore, a heat insulating laminate structure having an excellent solar radiation shielding capability and an excellent radio wave transparency can be obtained.

DESCRIPTION OF EMBODIMENTS

A detailed description of a method for producing a heat insulating laminate structure according to a preferred embodiment of the present invention (which may be referred to as "the present production method" in the following) will now be provided.

Figure 1:
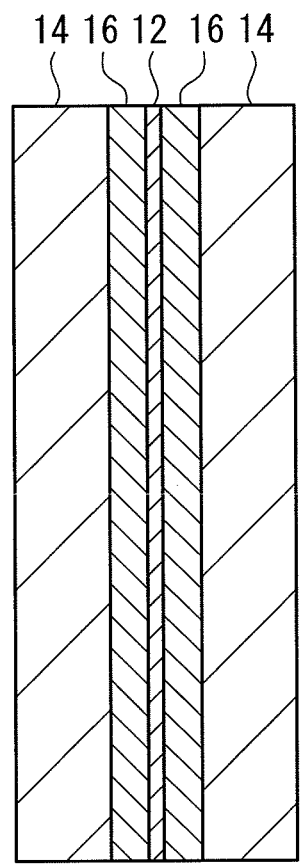
FIG. 1 is a cross sectional view showing a heat insulating laminate structure according to a preferred embodiment of the present invention.

The present production method comprises a step of bonding two transparent substrates to each other through a transparent laminate film having a specific structure (which may be referred to as "the present film") by applying a pressure. By the present production method, as shown in FIG. 1, a heat insulating laminate structure 10 is obtained in which a transparent laminate film 12 is placed between two transparent substrates 14, 14 and the two transparent substrates 14, 14 are bonded to each other through the transparent laminate film 12.

In the present production method, the present film comprises a transparent polymer film and a laminated layer structure at least. Preferred embodiments of the present film are shown in FIGS. 2 and 3.

Figure 2A:
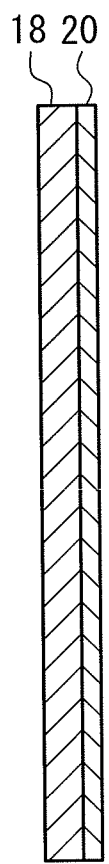
FIG. 2 is a cross sectional view showing transparent laminate films according to a preferred embodiment of the present invention.
Figure 2B:
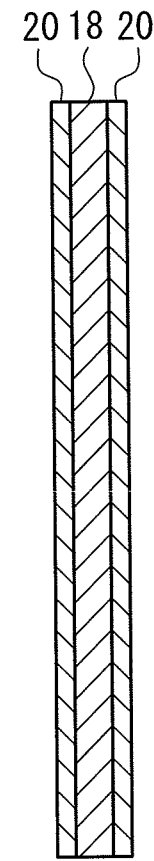

As shown in FIG. 2, a first embodiment of the present film comprises a transparent polymer film 18 and a laminated layer structure(s) 20 formed directly on the polymer film 18. The film shown in FIG. 2A comprises the laminated layer structure 20 on one of the sides of the transparent polymer film 18. The film shown in FIG. 2B comprises the laminated layer structures 20 on both sides of the transparent polymer film 18.

Figure 3A:
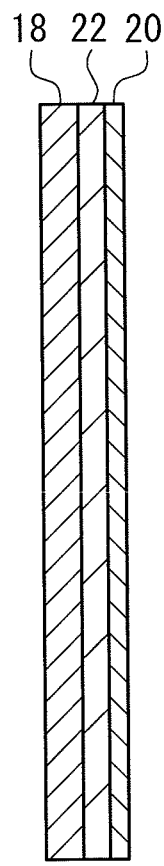
FIG. 3 is a cross sectional view showing transparent laminate films according to a preferred embodiment of the present invention.
Figure 3B:
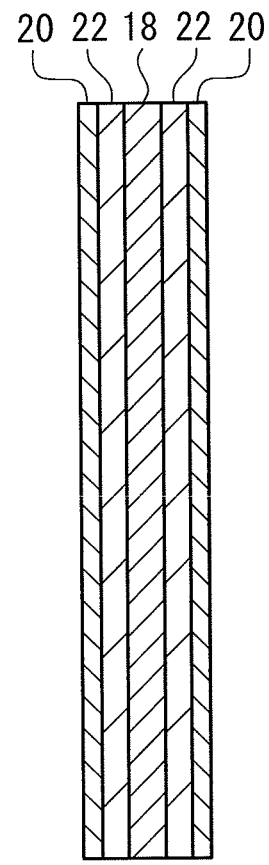

As shown in FIG. 3, a second embodiment of the present film comprises a laminated layer structure(s) 20 formed on a transparent polymer film 18 through an easy adhesion layer(s) 22. The film shown in FIG. 3A comprises the laminated layer structure 20 formed on one side of the transparent polymer film 18 through the easy adhesion layer 22. The film shown in FIG. 3B comprises the laminated layer structures 20 on both sides of the transparent polymer film 18 through the easy adhesion layers 22.

When the transparent laminate film having the laminated layer structure 20 on one side of the transparent polymer film 18 as shown in FIGS. 2A and 3A further comprises another easy adhesion layer on the side opposite to the side on which the laminated layer structure is formed, winding workability and drawing workability of the transparent laminate film is improved.

The present film comprises at least a metal oxide layer (which may be sometimes referred to as an "MO layer" in abbreviation in the following) and a metal layer (which may be sometimes referred to as an "M layer" in abbreviation in the following). Examples of a basic structure of the laminated layer structure include a laminated layer structure in which the metal oxide layer containing an organic component (MO layer) and the metal layers (M layer) are alternately laminated. Further, barrier layer (which may be sometimes referred to as a "B layer" in abbreviation in the following) may be formed on any one side or both sides of the metal layer (M layer).

In the present film, a metal oxide layer containing an organic component improves the transparency (i.e., transmittance to visible rays) of the film when laminated together with the metal layer, and the metal oxide layer acts primarily as a high-refractive-index layer. Here, a high refractive index means a refractive index of 1.7 or higher with respect to light having a wavelength of 633 nm. Further, in the present film, a metal layer mainly acts as a solar radiation shielding layer. Having such a laminated layer structure, the present film has a good visible light transparency and a good solar radiation shielding capability.

The laminated layer structure may be obtained by a lamination process in which the metal oxide layer containing the organic component and the metal layer are laminated on at least one side of the transparent polymer film. Though the lamination process varies depending on the configuration of the laminated layer structure, the laminated layer structure may be formed basically by stacking the layers each formed by an optimal method in a layer-by-layer way. The laminated layer structure may be formed directly on the transparent polymer film, or may be formed on an easy adhesion layer formed on the polymer film.

Grooves are formed in the laminated layer structure. The metal layer is divided by these grooves. To be specific, the metal layer has portions of discontinuity therein. Examples of shapes of the grooves include, for example, regular shapes such as lattice-like and slit-like shapes; and irregular shapes such as cracks. The widths of the grooves are set at 30 µm or less in order that the grooves may be hardly visible and that a good appearance of the laminated layer structure may be ensured. The widths are preferably 20 µm or less and more preferably 10 µm or less.

On the other hand, though there is no particular restriction with regard to the lower limit of the widths of the grooves, the lower limit is preferably 0.05 µm and more preferably 0.1 µm from the viewpoint of ensuring the radio wave transparency of the laminated layer structure. The widths of the grooves are represented by an averaged value of the widths of three grooves on each of five surface images of the laminated layer structure obtained with an optical microscope (i.e., an averaged value of the widths of fifteen grooves in total).

Examples of the method to form grooves include a method of applying a stress to generate cracks in the laminated layer structure formed by the lamination process (1); a method of subjecting a surface of the laminated layer structure to a laser processing (2); a method of stretching the film having the laminated layer structure formed therein to generate cracks (3); and a method of forming the laminated layer structure on the transparent polymer film through the easy adhesion layer to generate cracks (4).

In the case of method (1), grooves with irregular shapes can be formed by the cracks. An example of method (1) comprises a step of causing a starting material for the metal oxide layer in the laminate layer structure to undergo a reaction by a sol-gel method and a step of forming cracks by a stress generated in the laminated layer structure during the reaction process.

To be more specific, for example, the method comprises a step of supplying energy such as of ultraviolet light, electron beam, and heat from the surface of the laminated layer structure in an atmosphere containing oxygen ($O_2$), ozone ($O_3$), or moisture. By this step, the starting material is caused to undergo the reaction, and cracks are formed by a stress generated in the laminated layer structure during the reaction.

When grooves are formed as cracks in method (1), it is preferable that the outermost layer of the laminated layer structure is a metal oxide layer containing the starting material of the sol-gel method. This is because the sol-gel reaction of the starting material contained in the outermost layer proceeds easily. whereby cracks are induced in the metal oxide layer by cure shrinkage, and, starting from these cracks, the cracks are easily propagated into the laminated layer structure.

In the case of method (2), grooves having regular shapes such as lattice-like and slit-like shapes can be formed. Whether a groove is formed by a laser processing or not can be generally examined by observation of an edge of the groove. Processing conditions for the laser processing in method (2) is not particularly limited as far as grooves of widths of 30 µm or less can be formed. Examples of the applied laser wavelength include wavelengths within a range of 0.1-10 µm.

In the case of method (3), grooves with irregular shapes can be formed by the cracks. The film stretching in method (3) may be any one of uniaxial stretching and biaxial stretching. When the groove formation is performed by film stretching, hardly visible cracks can be introduced into the laminated layer structure relatively easily. In particular, when the stretching is biaxial stretching, non-directional cracks are easily formed.

In the case of method (4), a phenomenon is observed in which when the laminated layer structure is formed on the easy adhesion layer, cracks are easily formed in the layers constituting the laminated layer structure during the formation of the laminated layer structure. Thereby, grooves having irregular shapes are formed. Though a detailed mechanism of the phenomenon is unknown, it occurs presumably because crack formation is promoted by a stress caused by shrinkage of the easy adhesion layer due to the formation of the laminated layer structure, by stress concentration on protruding portions due to dispersed particles such as silica particles, which are often contained in the easy adhesion layer, or by surface roughness of the easy adhesion layer. Regardless of the underlying mechanism, the cracks formed during the formation of the laminated layer structure can be used as the grooves, whereby the continuity of the metal layer constituting the laminated layer structure can be broken in the lamination process. Therefore, a groove formation process can be omitted.

Though the type of the transparent substrates is not limited specifically in the present production method as far as the substrates have sufficient visible light transparencies, preferable examples of the substrates include glass plates and resin plates. Examples of the glass include a normal float glass, a half tempered glass, and a tempered glass. Examples of the resin include an acrylic resin and a polycarbonate resin. The thicknesses of the transparent substrates may be determined according to the application of the laminated layer structure, for example.

In the present production method, an adhesive may be used to bonding the two transparent substrates to each other. Examples of a main component of the adhesive include polyvinyl butylal (PVB), ethylene vinyl acetate (EVA), an acrylic resin, a silicone resin, and a urethane resin. Either liquid or solid adhesive may be used. Examples of the solid adhesive include a film-type adhesive. When an adhesive is used in the present production method, the transparent laminate film 12 is bonded to the transparent substrate 14 through an adhesion layer 16.

In the present production method, when the two substrates are bonded to each other through the present film under application of a pressure, cracks are further formed in the laminated layer structure by the applied pressure starting from the grooves, and division of the metal layer, which is already divided by the grooves, proceeds further. By this process, the overall surface resistance of the produced heat insulating laminate structure is increases. A surface resistance and a transmission attenuation of radio waves are in close relation to each other: as the surface resistance increases, the transmission attenuation of radio waves is decreased and the radio wave transparency is increased. Therefore, the present production method increases the radio wave transparency of the laminate structure.

In the present production method, a practically sufficient radio wave transparency is ensured by formation of the cracks on bonding of the two transparent substrates and by concomitant increase of the surface resistance.

The present production method is especially effective and significant, for example, in case the grooves formed in the laminated layer structure of the present film in advance of the bonding of the two transparent substrate hardly provide a sufficient surface resistance to ensure a practically sufficient radio wave transparency or in case the adjustment of the surface resistance to a desirable value is difficult.

For example, among the above mentioned methods to form the grooves, in methods (1), (3), and (4) the cracks are formed by such factors as cure shrinkage of the metal oxide layer, shrinkage of the easy adhesion layer, and the amplitude of the force applied during the stretching. Thus it may be more difficult than in the case of method (2) to obtain a sufficient surface resistance to ensure a practically sufficient radio wave transparency or to adjust the surface resistance to a desired value.

In the present production method, the surface resistance may be easily adjusted to a desired value by adjustment of the conditions on bonding of the two substrates such as the pressure applied and the temperature. The surface resistance can also be adjusted finely.

The overall surface resistance of the heat insulating laminate structure is preferably 500Ω/□ or more, which is a range in which the laminate structure has a practical radio wave transparency, and more preferably 1000Ω/□ or more. On the other hand, there is no particular restriction with regard to the upper limit of the overall surface resistance. The surface resistance may be measured using an eddy current meter, for example.

Further, from the viewpoint of easiness in adjusting the overall surface resistance of the heat insulating laminate structure to within the desirable range, the surface resistance of the present film is preferably 10Ω/□ or more, more preferably 20Ω/□ more, and even more preferably 50Ω/□ or more, with having the grooves. On the other hand, there is no particular restriction with regard to the upper limit of the surface resistance of the present film. The surface resistance of the present film may be adjusted, for example, by controlling the ratio of the areas of the grooves with respect to the surface area of the metal film and/or the depths of the grooves through adjustment of formation conditions of the metal oxide layer.

It is preferable that numerous cracks are formed on formation of grooves in the laminated layer structure or on bonding of the two transparent substrates 14. Uniform formation of cracks results in small directionality in the surface resistance, which contributes to uniformity of the surface resistance.

Among the methods to form the grooves in the laminated layer structure, in method (3), when the biaxial stretching is performed as the stretching process, non-directional cracks are easily formed. Thus, a transparent laminate film is obtained that has a surface resistance with low directionality and high uniformity.

In method (3), the lower limit of a tensile ratio during the stretching is preferably 0.5%, more preferably 1%, and even more preferably 2% from the viewpoint of ensuring the surface resistance. On the other hand, the upper limit of the tensile ratio is preferably 50%, more preferably 40%, and even more preferably 30% from the viewpoint of ensuring flatness, heat resistance, and optical properties of the film.

The present film preferably has a visible light transmittance of 60% or more. This is because the film having the visible light transmittance is useful as a film to be applied to a window glass of an architectural structure such as a building and a house and a window glass of a vehicle such as an automobile. The visible light transmittance is more preferably 65% or more and even more preferably 70% or more.

The present film is suitably used for transmission of a radio wave having a frequency of 100 MHz or more. Specific examples of the radio wave include radio waves of an ETC system (5.8 GHz) and a mobile phone (800 MHz-2.2 GHz).

In the present film, the transparent polymer film acts as a base material for formation of the laminated layer structure. As a material of the transparent polymer film, any material may be used, as far as the material has transparency in the visible region and a thin layer can be formed without any difficulty on the surface thereof.

Specific examples of the material of the transparent polymer film include polymer materials such as polyethyleneterephthalate, polycarbonate, polymethylmethacrylate, polyethylene, polypropylene, ethylene-vinyl acetate copolymer, polystyrene, polyimide, polyamide, polybutyleneterephthalate, polyethylenenaphthalate, polysulfone, polyethersulfone, polyetheretherketone, polyvinyl alcohol, polyvinyl chloride, polyvinylidene chloride, triacetylcellulose, polyurethane, cyclo-olefin polymer. These materials may be contained in the polymer film singly or in combination. Further, two or more kinds of transparent polymers may be laminated.

Among them, from the viewpoint of having excellent transparency, durability, and workability, particularly preferable examples include polyethyleneterephthalate, polycarbonate, polymethylmethacrylate, and cyclo-olefin polymer.

The thickness of the transparent polymer film may be adjusted variously taking into account the application of the present film and the material, optical properties, and durability of the polymer film. From the viewpoint of inhibiting formation of wrinkles and breaks during processing, the lower limit of the thickness of the transparent polymer film is 25 μm, and more preferably 50 μm. On the other hand, from the viewpoints of easiness in winding the film and economic efficiency, the upper limit of the thickness is preferably 500 μm, and more preferably 250 μm.

In the present film, an easy adhesive layer is used mainly for a purpose of improving winding workability and handling ability of the transparent polymer film. In particular, such an easy adhesion layer is often formed on a transparent polymer film for optical applications, for which it is difficult to achieve the above mentioned purpose by mixing silica particles or the like therein or by attaching them to a surface thereof.

Specific examples of a polymer material constituting the easy adhesion layer include acrylic, urethane, polyester, and acrylic-urethane resins. In the easy adhesion layer, silica particles or polyethylene particles may be dispersed.

The thickness of the easy adhesion layer is not specifically limited. From the viewpoints of adhesiveness, transparency, and cost of the easy adhesion layer, the upper limit of the thickness is preferably 20 μm, more preferably 10 μm, and even more preferably 5 μm. On the other hand, from the viewpoint of performance of the function of the easy adhesion layer, the lower limit of the thickness of the layer is preferably 0.1 μm, more preferably 0.2 μm, and even more preferably 0.3 μm.

The present film may further comprise a protect on film on the laminated layer structure that protects the present film from scratches. Examples of a polymer material composing the protection layer include an acrylic resin. The thickness of the protection film is preferably within a range of 1-2 μm from the viewpoint of a balance between the protection property and properties such as adhesiveness, transparency, and cost.

Specific examples of a basic unit of the laminated layer structure include, first basic units such as, from the transparent polymer film side, MO layer|B layer/M layer/B layer, MO layer|M layer/B layer, and MO layer|B layer/M layer; and second basic units such as, from the transparent polymer film side, B layer/M layer/B layer|MO layer, M layer/B layer|MO layer, and B layer/M layer|MO layer. Here, "|" means a separation between layers; and "/" means that a B layer is attached to an M layer.

In the laminated layer structure, one or more basic units selected from the first basic units may be laminated singly or repeatedly, or alternatively, one or more basic units selected from the second basic units may be laminated singly or repeatedly.

Among them, from the viewpoint of effectively inhibiting diffusion of an element constituting the M layer into the MO layer, the unit of MO layer|B layer/M layer/B layer from the first basic units and the unit of B layer/M layer/B layer|MO layer from the second basic units are preferably selected.

Among the thin layers constituting the laminated layer structure, a thin layer in contact with the transparent polymer film is preferably a metal oxide layer containing an organic component (MO layer), which brings about advantages of excellent optical properties such as high visible light transparency and low visible light reflection. Further, among the thin layers constituting the laminated layer structure, a thin layer arranged as an outermost layer is preferably a metal oxide layer containing an organic component (MO layer), which brings about advantages such as easiness in formation of the grooves (particularly in the case using cracks) as described above.

The number of laminating layers in the laminated layer structure can be determined taking into account optical properties such as visible light transparency and solar radiation shielding capability, overall surface resistance of the film, material and thickness of each thin layer, and production cost. The laminated layer structure comprises preferably 2 to 10 layers, and more preferably an odd number of layers such as 3, 5, 7, and 9 layers. From the viewpoint of a production cost, the laminated layer structure even more preferably comprises 3, 5, or 7 layers.

To be more specific, from the viewpoint of a good balance between transparency and solar radiation shielding capability of the laminated layer structure and the view point of suppression of production cost, examples of preferred structures as the laminated layer structure include three-layer structures such as MO layer (first layer)|B layer/M layer/B layer (second layer)|MO layer (third layer), MO layer (first layer)|B layer/M layer (second layer)|MO layer (third layer), MO layer (first layer)|M layer/B layer (second layer)|MO layer (third layer), MO layer (first layer)|M layer (second layer) |MO layer (third layer); five-layer structures such as MO layer (first layer)|B layer/M layer/B layer (second layer)|MO layer (third layer)|B layer/M layer/B layer (fourth layer)|MO layer (fifth layer), MO layer (first layer)|B layer/M layer (second layer)|MO layer (third layer)|B layer/M layer (fourth layer)|MO layer (fifth layer), MO layer (first layer)|M layer/B layer (second layer)|(MO layer (third layer)|M layer/B layer (fourth layer)|MO layer (fifth layer), MO layer (first layer)|M layer (second layer)|MO layer (third layer)|M layer (fourth layer)|MO layer (fifth layer); and seven-layer structures such as MO layer (first layer)|B layer/M layer/B layer (second layer)|MO layer (third layer)|B layer/M layer/B layer (fourth layer)|MO layer (fifth layer)|B layer/M layer/B layer (sixth layer)|MO layer (seventh layer), MO layer (first layer)|B layer/M layer (second layer)|MO layer (third layer)|B layer/M layer (fourth layer)|MO layer (fifth layer)|B layer/M layer (sixth layer)|MO layer (seventh layer), MO layer (first layer)|M layer/B layer (second layer)|MO layer (third layer) |M layer/B layer (fourth layer)|MO layer (fifth layer)|M layer/B layer (sixth layer)|MO layer (seventh layer), MO layer (first layer)|M layer (second layer)|MO layer (third layer)|M layer (fourth layer)|MO layer (fifth layer)|M layer (sixth layer)|MO layer (seventh layer), each from the transparent polymer film side.

A B layer is a thin layer attached to an M layer. Thus, for on counting the number of laminating layers in the present application, an M layer including a B layer is counted as one layer, and an MO layer is counted as one layer.

In the present film, each thin layer may be formed at once or may be formed in a divided manner. Further, some or all of the thin layers contained in the laminated layer structure may be formed in a divided manner. In a case where each thin layer is composed of a plurality of divisional layers, the numbers of divisions for the thin layers may be the same or may be different. A divisional layer is not counted as one laminating layer, but one thin layer formed by an integration of a plurality of divisional layers is counted as one layer.

In the present film, compositions and materials of the thin layers of each type may be the same or different. This also applies to the case where each thin layer is formed from a plurality of divisional layers. Thickness of the thin layers of each type may be approximately the same, or may be different for each individual layer.

In the following, the metal oxide layer (MO layer) and metal layer (M layer), which constitute the laminated layer structure of the present film, and the barrier layer (B layer), which may be optionally included in the laminated layer structure of the present film, are explained in detail.

<Metal Oxide Layer>

Specific examples of metal oxides constituting the metal oxide layer include oxides of titanium, zinc, indium, tin, indium-tin, magnesium, aluminum, zirconium, niobium, and cerium. These species may be contained in the metal oxide layer singly or in combination. Further, a composite oxide that comprises two or more of these metal oxides may also be applicable.

In particular, from the viewpoint of having a relatively large refractive index with respect to visible light, examples of preferable metal oxides include titanium oxide ($TiO_2$), ITO, zinc oxide (ZnO), and tin oxide ($SnO_2$). These species may be contained in the metal oxide layer singly or in combination.

Though the metal oxide layer is mainly composed of the above mentioned metal oxide, an organic component may also be contained in addition to the metal oxide. This is because the flexibility of the present film is improved when the film contains an organic component. Specific examples of the organic component of this kind include components originating from a starting material for a sol-gel method and components originating from a formation material of the metal oxide layer.

More specific examples of the organic component include organometallic compounds (including decomposed materials thereof) such as alkoxides, acylates and chelates of the metals constituting the above described metal oxides; and various kinds of additives such as (below-described) organic compounds that form ultraviolet absorbing chelates by reacting with the organometallic compounds. These compounds may be contained singly or in combination.

From the viewpoint of effectively imparting flexibility to the metal oxide layer, the lower limit of the content of the organic component in the metal oxide layer is preferably 3 mass %, more preferably 5 mass %, and even more preferably 7 mass %. On the other hand, from the viewpoint of effectively ensuring a high refractive index and solvent resistance of the metal oxide, the upper limit of the content is preferably 30 mass %, more preferably 25 mass %, and even more preferably 20 mass %.

The content of the organic component can be examined with x-ray photoelectron spectroscopy (XPS), for example. The type of the organic component can be examined with infrared spectroscopy (IR) (infrared absorption analysis), for example.

The thickness of the metal oxide layer may be adjusted by considering the solar radiation shielding capability, visibility, and reflected color.

From the viewpoints of effectively inhibiting the reflected color from being reddish or yellowish and obtaining high transparency, the lower limit of the thickness of the metal oxide layer is preferably 10 nm, more preferably 15 nm or more, and even more preferably 20 nm or more. On the other hand, from the viewpoints of effectively inhibiting the reflected color from being greenish and obtaining high transparency, the upper limit of the thickness of the metal oxide layer is preferably 90 nm, more preferably 85 nm, and even more preferably 80 nm.

The metal oxide layer, which has the above described configuration, may be formed with any one of a gas phase method and a liquid phase method. The liquid phase method, in contrast to the gas phase method, does not require evacuation and use of a high electric power. Therefore, the liquid phase method is cost-effective, and is also excellent in productivity, and thus is a preferable method.

As the liquid phase method, from the viewpoint of effectively leaving the remaining organic component, a sol-gel method may be preferably used.

Specific examples of the sol-gel method include, a method in which a coating liquid containing an organometallic compound of the metal that constitutes the metal oxide is applied as a thin layer, which is dried as necessary, to form a precursor layer of a metal oxide layer, and thereafter, the organometallic compound contained in this precursor layer is caused to undergo a hydrolysis-condensation react ion to synthesize an oxide of the metal constituting the organometallic compound. By this method, the metal oxide layer, containing the metal oxide as a main component and the organic component, is formed. In the following, the above method is explained in detail.

The coating liquid may be prepared by dissolving the organometallic compound in an appropriate solvent. Specific examples of the organometallic compound include organometallic compounds of metals such as titanium, zinc, indium, tin, magnesium, aluminum, zirconium, niobium, cerium, silicon, hafnium and lead. These compounds may be contained in the liquid singly or in combination.

Specific examples of the organometallic compound include alkoxides, acylates, and chelates of the above metals. From the viewpoint of stability in the air, the metal chelates are preferable.

As the organometallic compound, an organic compound of a metal that forms a metal oxide having a high refractive index is preferably used in particular. Examples of such an organometallic compound include organotitanium compounds.

Specific examples of the organotitanium compounds include titanium alkoxides having an M-O—R bond (where R denotes an alkyl group and M denotes a titanium atom) such as tetra-n-butoxy titanium, tetraethoxy titanium, tetra-i-propoxy titanium, and tetramethoxy titanium; titanium acylates having an M-O—CO—R bond (where R denotes an alkyl group and M denotes a titanium atom) such as isopropoxy titanium stearate; titanium chelates such as titanium diisopropoxy bis(acetylacetonate), titanium dihydroxy bis(lactate), titanium diisopropoxy bis(triethanolaminato), and titanium diisopropoxy bis(ethyl acetoacetate). One kind of these compounds may be used singly, or two or more kinds may be mixed. Further, these compounds may be monomers or polymers.

From the viewpoint of uniformity of the thickness of a coating film and the viewpoint of the thickness of a film obtained by one coating, a content of an organometallic compound in the coating liquid is preferably within a range of 1-20 mass %, more preferably within a range of 3-15 mass %, and even more preferably within a range of 5-10 mass %.

Specific examples of a solvent dissolving the organometallic compound include alcohols such as methanol, ethanol, propanol, butanol, heptanol, and isopropyl alcohol; organic acid esters such as ethyl acetate; ketones such as acetonitrile, acetone, and methyl ethyl ketone; cyclo-ethers such as tetrahydrofuran and dioxane; acid amides such as formamide and N,N-dimethylformamide; hydrocarbons such as hexane; and aromatics such as toluene. One of these solvents may be used singly or two or more may be mixed.

From the viewpoint of uniformity of the thickness of a coating film and the viewpoint of the thickness of a film obtained by one coating, an amount of the solvent is preferably within a range of 5-100 times, more preferably within a range of 7-30 times, and even more preferably within a range of 10-20 times of the mass of the organometallic compound in solid state.

When the amount of the solvent is more than 100 times, there is a tendency that the film thickness achieved by one coating is small, and multiple times of coating is necessary in order to achieve a desired film thickness. On the other hand, when the amount of the solvent is less than 5 times, there is a tendency that the film thickness is too large and the hydrolysis-condensation reaction of the organometallic compound is difficult to proceed sufficiently. Therefore, the amount of the solvent is preferably selected taking these factors into consideration.

From the viewpoints of promoting hydrolysis in the sol-gel method and effectively achieving a high refractive index, the coating liquid may contain water as needed.

The coating liquid may be prepared, for example, by a method such as stirring and mixing the organometallic compound weighed so as to achieve a predetermined ratio, an appropriate amount of the solvent, and other ingredients added as needed, for a predetermined period of time using a stirring means such as a stirrer. In this case, the mixing of the components may be conducted at one time or may be divided into multiple times.

From the viewpoint of facilitating a uniform coating, examples of a preferable method for coating of the above mentioned coating liquid include various wet coating methods such as a micro-gravure method, a gravure method, a reverse roll coating method, a die coating method, a knife coating method, a dip coating method, a spin coating method and a bar coating method. These methods may be selected appropriately and used singly or in combination.

When an applied coating liquid is dried, a conventional drying equipment may be used. Specific examples of drying conditions include a temperature range of 80-120° C. and a drying period of 0.5-5 minutes.

Specific examples of the means for causing the organometallic compound in the precursor layer to undergo a hydrolysis-condensation reaction include application of optical energy such as ultraviolet and x rays, application of electron beam, and heating. These may used singly or in combination. Among them, the application of optical energy, or in particular, ultraviolet irradiation may be preferably used. This is because, in the case of application of optical energy, a metal oxide can be produced at a lower temperature and in a shorter period and a smaller amount of thermal load such as thermal degradation is added to the transparent polymer film than in the case of the other methods (and particularly in the case of ultraviolet irradiation, there is an advantage that only a relatively simple equipment is required). Further, there is an advantage that it is likely for the organometallic compound (including decomposed materials thereof) to remain as the organic component.

In this case, specific examples of an ultraviolet irradiation equipment include a mercury lamp, a xenon lamp, a deuterium lamp, an excimer lamp and a metal halide lamp. These may be used singly or in combination.

Intensity of the applied optical energy can be adjusted variously taking into consideration, for example, the type of the organometallic compound mainly composing the precursor layer and the thickness of the coating layer. When the intensity of the applied optical energy is too small, a high refractive index of the metal oxide layer is hard to be achieved. On the other hand, when the intensity is too large, the transparent polymer film may be deformed due to heat generated during application of the optical energy. Therefore, it is preferred to pay attention to these factors.

In the case where ultraviolet rays are applied as the optical energy, the intensity of the rays measured within a wavelength range of 300-390 nm is preferably within a range of 300-8000 mJ/cm$^2$, and more preferably within a range of 500-5000 mJ/cm$^2$ from the viewpoints of the refractive index of the metal oxide layer and damage received by the transparent polymer film.

When the optical energy is applied as a means for causing the organometallic compound in the precursor layer to undergo a hydrolysis-condensation reaction, it is preferable that an additive such as an organic compound that reacts with the organometallic compound to form a light absorbing (for example, ultraviolet absorbing) chelate is added to the above described coating liquid. When the additive is added to the coating liquid, which is a starting solution, a light absorbing chelate formed in advance is irradiated with the optical energy. Therefore, a high refractive index of a metal oxide layer can be easily achieved at a relatively low temperature.

Specific examples of the above additive include additives such as β-diketones, alkoxy alcohols and alkanolamines. More specific examples of the β-diketones include acetylacetone, benzoylacetone, ethyl acetoacetate, methyl acetoacetate and diethyl malonate. Examples of the alkoxy alcohols include 2-methoxyethanol, 2-ethoxyethanol, and 2-methoxy-2-propanol. Examples of the alkanolamines include monoethanolamine, diethanolamine, and triethanolamine. One of these may be used singly or two or more may be mixed.

Among these compounds, the β-diketones are particularly preferable. Among the β-diketones, the acetylacetone may be most preferably used.

From the viewpoint of effectively increasing the refractive index and the viewpoint of stability of the additive in a coating film, a mixing ratio of the above additive is preferably within a range of 0.1-2 moles, and more preferably within a range of 0.5-1.5 moles, with respect to 1 mole of metal atoms in the above organometallic compound.

<Metal Layer>

Specific examples of the metals constituting the metal layer include metals such as silver, gold, platinum, copper, aluminum, chromium, titanium, zinc, tin, nickel, cobalt, niobium, tantalum, tungsten, zirconium, lead, palladium, and indium; and alloys of these metals. These species may be used singly or in combination.

From the viewpoint of excellence invisible light transparency, heat ray reflectivity, and electrical conductivity in the laminated layer structure, the metal is preferably silver or a silver alloy. From the viewpoint of improving durability with respect to an environment such as heat, light, and moisture, the metal is more preferably a silver alloy containing silver as a main component and at least one or more metal elements such as copper, bismuth, gold, palladium, platinum, and titanium. It is even more preferable that the metal is a copper-containing silver alloy (Ag—Cu alloy), a bismuth-containing silver alloy (Ag—Bi alloy), or a titanium-containing silver alloy (Ag—Ti alloy). This is because they have advantages such as large effects of inhibiting diffusion of silver and a cost efficiency.

When a copper-containing silver alloy is used, in addition to silver and copper, other elements or unavoidable impurities may also be contained in the alloy as far as they do not adversely affect, for example, the effect inhibiting aggregation and diffusion of silver in the Ag—Cu alloy.

Specific examples of the above-mentioned other elements include elements soluble in Ag such as Mg, Pd, Pt, Au, Zn, Al, Ga, In, Sn, Sb, Li, Cd, Hg, and As; elements that can be precipitated singly in an Ag—Cu alloy such as Be, Ru, Rh, Os, Ir, Bi, Ge, V, Nb, Ta, Cr, Mo, W, Mn, Re, Fe, Co, Ni, Si, Tl, and Pb; elements that can precipitate intermetallic compounds with Ag such as Y, La, Ce, Nd, Sm, Gd, Tb, Dy, Ti, Zr, Hf, Na, Ca, Sr, Ba, Sc, Pr, Eu, Ho, Er, Tm, Yb, Lu, S, Se, and Te. These elements may be contained in the alloy singly or in combination.

When a copper-containing silver alloy is used, from the viewpoint of benefiting an effect of addition of copper, the lower limit of the copper content is preferably 1 atom %, more preferably 2 atom %, and even more preferably 3 atom %. On the other hand, from the viewpoint of effectively ensuring high transparency of the metal layer and the viewpoint of manufacturability such as easiness in preparation of a sputtering target, the upper limit of the copper content is preferably 20 atom %, more preferably 10 atom %, and even more preferably 5 atom %.

When a bismuth-containing silver alloy is used, in addition to silver and bismuth, other elements or unavoidable impurities may also be contained in the alloy as far as they do not adversely affect, for example, the effect of inhibiting aggregation and diffusion of silver.

Specific examples of the above-mentioned other elements include elements soluble in Ag such as Mg, Pd, Pt, Au, Zn, Al, Ga, In, Sn, Sb, Li, Cd, Hg, and As; elements that can be precipitated singly in an Ag—Bi alloy such as Be, Ru, Rh, Os, Ir, Cu, Ge, V, Nb, Ta, Cr, Mo, W, Mn, Re, Fe, Co, Ni, Si, Tl, and Pb; and elements that can precipitate intermetallic compounds with Ag such as Y, La, Ce, Nd, Sm, Gd, Tb, Dy, Ti, Zr, Hf, Na, Ca, Sr, Ba, Sc, Pr, Eu, Ho, Er, Tm, Yb, Lu, S, Se, and Te. These elements may be contained in the alloy singly or in combination.

When a bismuth-containing silver alloy is used, from the viewpoint of benefiting an effect of addition of bismuth, the lower limit of the bismuth content is preferably 0.01 atom %, more preferably 0.05 atom %, and even more preferably 0.1 atom %. On the other hand, from the viewpoint of manufacturability such as easiness in preparation of a sputtering target, the upper limit of the bismuth content is preferably 5 atom %, more preferably 2 atom %, and even more preferably 1 atom %.

When a titanium-containing silver alloy is used, in addition to silver and titanium, other elements or unavoidable impurities may also be contained in the alloy as far as they do not adversely affect, for example, the effect of inhibiting aggregation and diffusion of silver.

Specific examples of the above-mentioned other elements include elements soluble in Ag such as Mg, Pd, Pt, Au, Zn, Al, Ga, In, Sn, Sb, Li, Cd, Hg, and As; elements that can be precipitated singly in an Ag—Ti alloy such as Be, Ru, Rh, Os, Ir, Cu, Ge, V, Nb, Ta, Cr, Mo, W, Mn, Re, Fe, Co, Ni, Si, Tl, Pb, and Bi; and elements that can precipitate intermetallic compounds with Ag such as Y, La, Ce, Nd, Sm, Gd, Tb, Dy, Zr, Hf, Na, Ca, Sr, Ba, Sc, Pr, Eu, Ho, Er, Tm, Yb, Lu, S, Se, and Te. These elements may be contained in the alloy singly or in combination.

When a titanium-containing silver alloy is used, from the viewpoint of benefiting an effect of addition of titanium, the lower limit of the titanium content is preferably 0.01 atom %, more preferably 0.05 atom %, and even more preferably 0.1 atom %. On the other hand, from the viewpoint of effectively forming a complete solid solution on formation of the layer, the upper limit of the content of titanium is preferably 2 atom %, more preferably 1.75 atom %, and even more preferably 1.5 atom %.

Content ratio of an additive element such as copper, bismuth, and titanium, may be measured with ICP analysis. A metal (including alloy) constituting the metal layer may be partially oxidized.

From the viewpoints of stability and heat ray reflectivity of the metal layer, the lower limit of the thickness of the metal layer is preferably 3 nm, more preferably 5 nm, and even more preferably 7 nm. On the other hand, from the viewpoints of visible light transparency and economic efficiency, the upper limit of the thickness is preferably 30 nm, more preferably 20 nm, and even more preferably 15 nm.

Specific examples of a method for forming the metal layer include physical vapor deposition (PVD) methods such as a vacuum deposition method, a sputtering method, an ion plating method, an MBE method, and a laser ablation method; and chemical vapor deposition (CVD) methods such as a thermal CVD method and a plasma CVD method. The metal layer may be formed by these methods singly or in combination.

Among these methods, from the viewpoints of obtaining a dense layer and controlling the layer thickness relatively easily, the sputtering method such as a DC magnetron sputtering method and an RF magnetron sputtering method may be preferably used.

The metal layer may be oxidized, for example, by the post-oxidization, which will be described later, to the extent that functions of the metal layer are not impaired.

<Barrier Layer>

In the present film, a barrier layer mainly acts as a barrier inhibiting diffusion of an element constituting the metal layer into the metal oxide layer. Further, by intervening between the metal oxide layer and the metal layer, the barrier layer also contributes to improvement of adhesion between the metal oxide layer and the metal layer.

As far as being able to inhibit the diffusion, the barrier layer may even have a discontinuous part such as an island structure.

Specific examples of a metal oxide constituting the barrier layer include oxides of titanium, zinc, indium, tin, indium-tin, magnesium, aluminum, zirconium, niobium, and cerium. These oxides may be contained in the barrier layer singly or in combination. Further, these metal oxides may also constitute a composite oxide, which comprises two or more kinds of metal oxides. Besides the metal oxides, the barrier layer may also contain unavoidable impurities.

From the viewpoint of having an excellent effect of inhibiting diffusion of metal atoms constituting the metal layer and an excellent adhesion, the barrier layer is preferably composed mainly of an oxide of a metal contained in the metal oxide layer.

To be more specific, for example, when a $TiO_2$ layer is selected as the metal oxide layer, the barrier layer is preferably a titanium oxide layer composed mainly of an oxide of Ti, which is the metal contained in the $TiO_2$ layer.

When the barrier layer is a titanium oxide layer, the barrier layer may be a thin layer formed originally as a titanium oxide layer, a thin layer formed by post-oxidization of a metallic Ti layer, or a thin layer formed by post-oxidization of a partially oxidized titanium layer.

Though the barrier layer is composed mainly of a metal oxide, as the metal oxide layer is, the barrier layer is configured to have a smaller thickness than the metal oxide layer. This is because diffusion of the metal constituting the metal layer occurs at an atomic level so that the necessity is low for the barrier layer to have a thickness as large as required to ensure a sufficient refractive index. Further, a thinner layer may be formed at a lower cost, and thus can contribute to reduction of the production cost of the present film.

From the viewpoint of effectively ensuring a barrier property, the lower limit of the thickness of the barrier layer is preferably 1 nm, more preferably 1.5 nm, and even more preferably 2 nm. On the other hand, from the viewpoint of economic efficiency, the upper limit of the thickness is preferably 15 nm, more preferably 10 nm, and even more preferably 8 nm.

When the barrier layer is composed mainly of a titanium oxide, from the viewpoint of the barrier property, an atomic molar ratio of titanium with respect to oxygen, Ti/O, in the titanium oxide has a lower limit of preferably 1.0/4.0, more preferably 1.0/3.8, even more preferably 1.0/3.5, even more preferably 1.0/3.0, and most preferably 1.0/2.8.

When the barrier layer is composed mainly of a titanium oxide, from the viewpoint of visible light transparency, it is desirable that the atomic molar ratio of titanium with respect to oxygen, Ti/O, in the titanium oxide has an upper limit of preferably 1.0/0.5, more preferably 1.0/0.7, even more preferably 1.0/1.0, even more preferably 1.0/1.2, and most preferably 1.0/1.5.

The Ti/O ratio may be estimated from the composition of the barrier layer. As a composition analysis method for the barrier layer, from the viewpoint of an ability to analyze the composition of an extremely thin layer relatively accurately, energy dispersive fluorescent x-ray analysis (EDX) may be preferably used.

To explain a specific composition analysis method, first, by using an ultrathin sectioning method (such as microtome method), a test specimen is prepared having a thickness of 100 nm or less in a cross sectional direction of the laminated layer structure containing the barrier layer to be analyzed. Next, the laminated layer structure and location of the barrier layer therein are examined by observation of the specimen with a transmission electron microscope (TEM) from the cross sectional direction. Next, an electron beam is emitted from an electron gun of an EDX equipment and is made incident to a vicinity of the thickness-direction center of the layer to be analyzed. Electrons incident from a surface of the test specimen penetrate into a certain depth and generate various electron beams and x rays. By detecting and analyzing emitted characteristic x rays, constituent elements of the layer are analyzed.

In the present film, from the viewpoints of forming a dense layer and forming a thin layer having a uniform thickness of about several nanometers to several tens of nanometers, a gas phase method can be preferably used for formation of the barrier layer.

Specific examples of the gas phase method include physical vapor deposition (PVD) methods such as a vacuum deposition method, a sputtering method, an ion plating method, an MBE method, and a laser ablation method; and chemical vapor deposition (CVD) methods such as a thermal CVD method, and a plasma CVD method. As the gas phase method, the sputtering method such as a DC magnetron sputtering method, and an RF magnetron sputtering method may be preferably used, since the method provides more excellent adhesion at an interface between layers and easier control of the film thickness than the other methods such as the vacuum deposition method.

Each barrier layer contained in the laminated layer structure may be formed by these methods included in the gas phase method singly or in combination.

The barrier layer may be formed with the above described gas phase methods originally as a metal oxide layer. Alternatively, the barrier layer may be formed by first forming a metal layer or a partially oxidized metal layer and then post-oxidizing the metal layer or the partially oxidized metal layer. A partially oxidized metal layer is a metal oxide layer that can be further oxidized.

In the case where the barrier layer is formed originally as a metal oxide layer, a thin layer may be formed, for example, during a reaction between metal and oxygen as a reactive gas, which is provided as a mixture with a inert gas such as argon and neon as a sputtering gas (i.e., by a reactive sputtering method). In the case where, for example, a titanium oxide layer having the above mentioned Ti/O ratio is formed by the reactive sputtering method, an optimal oxygen concentration in the atmosphere (volume ratio of the oxygen-containing gas to the inert gas) may be appropriately selected by considering the above described thickness range.

Meanwhile, in the case where a metal layer or a partially oxidized metal layer is formed and then post-oxidized, specifically, the above described laminated layer structure may be formed on the transparent polymer film and thereafter the metal layer or partially oxidized metal layer in the laminated layer structure may be post-oxidized. For the formation of the metal layer, for example, a sputtering method may be used; for the formation of the partially oxidized metal layer, for example, the above described reactive sputtering method may be used. The post-oxidation may be conducted either before or after formation of the above described grooves.

Examples of the post-oxidation method include heat treatment, pressure treatment, chemical treatment, and natural oxidation. Among these post-oxidation methods, from the viewpoint of being a relatively simple and reliable post-oxidation process, the heat treatment is preferable. Examples of the heat treatment include a method in which the transparent polymer film having the above described laminated layer structure is placed in a heating atmosphere such as in a heating furnace, a warm-water-immersion method, a microwave heating method and a method in which the metal layer or the partially oxidized metal layer in the laminated layer structure are electrically heated. These methods may be performed singly or in combination.

As specific heating conditions during the heat treatment in a heating atmosphere, for example, a heating temperature is preferably within a range of 30-60° C., more preferably within a range of 32-57° C., and even more preferably within a range of 35-55° C., and a heating time of preferably 5 days or longer, more preferably 10 days or longer, and even more preferably 15 days or longer. This is because the above heating conditions provide good post-oxidation effect and inhibit thermal deformation and fusion bonding of the transparent polymer film.

The heat treatment is conducted preferably in an atmosphere containing oxygen or moisture such as in the air, a high oxygen atmosphere, and a high humidity atmosphere. From the viewpoints of manufacturability and cost reduction, the heat treatment is conducted more preferably in the air.

In a case where the above described post-oxidized thin layer is contained in the laminated layer structure, moisture and oxygen contained in the metal oxide layer are consumed during the post-oxidation. Therefore, even when exposed to sunlight, the metal oxide layer is unlikely to undergo a chemical reaction. As a specific example, in the case where a metal oxide layer is formed by a sol-gel method, since moisture and oxygen contained in the metal oxide layer are consumed during post-oxidation, it is unlikely for a sol-gel curing reaction to be caused by sunlight between a starting material of the sol-gel method (e.g., a metal alkoxide) remaining in the metal oxide layer and moisture (e.g., adsorbed water) or oxygen. Therefore, an internal stress caused by a volume change due to cure shrinkage can be relaxed, and interfacial peeling in the laminated layer structure is likely to be inhibited, which results in improved durability against sunlight.

EXAMPLE

A description of the present invention will now be specifically provided with reference to Examples.

1. Configuration of Transparent Laminate Film (with Grooves)

Each of the transparent laminate films according to Examples comprises a seven-layer laminated layer structure. In each seven-layer laminated layer structure, the following layers are laminated in a layer-by-layer way on one easy adhesion layer of a PET film having easy adhesion layers on both sides thereof: a $TiO_2$ layer formed by a sol-gel method and ultraviolet irradiation (first layer)|a layer formed by post-oxidization of a unit of a metallic Ti layer/an Ag—Cu alloy layer/a metallic Ti layer (second layer)|a $TiO_2$ layer formed by a sol-gel method and ultraviolet irradiation (third layer)|a layer formed by post-oxidization of a unit of a metallic Ti layer/an Ag—Cu alloy layer/a metallic Ti layer (fourth layer) |a $TiO_2$ layer formed by a sol-gel method and ultraviolet irradiation (fifth layer)|a layer formed by post-oxidization of a unit of a metallic Ti layer/an Ag—Cu alloy layer/a metallic Ti layer (sixth layer)|a $TiO_2$ layer formed by a sol-gel method and ultraviolet irradiation (seventh layer). In the above, the post-oxidized metallic Ti layers correspond to barrier layers. The barrier layers are included in the alloy layers as thin layers attached to the alloy layers on counting of the number of the laminated layers. The post-oxidation in the above is thermal oxidation. The seven-layer laminated layer structure comprises a protection layer on the surface thereof.

When the laminated layer structure is formed on the easy adhesion layer of the PET film, cracks are formed in the metal layers contained in the laminated layer structure. Thus, grooves are formed in the metal layers and the continuity of the metal layers is broken, which increases surface resistance of the laminated layer structure.

2. Preparation of Transparent Laminate Film (with Grooves)

In the following, specific preparation steps of the transparent laminate film (with grooves) are explained.

(Preparation of Coating Liquid)

First, a coating liquid used in formation of a $TiO_2$ thin layer by a sol-gel method was prepared. To be specific, the coating liquid was prepared by adding a tetra-n-butoxy titanium tetramer ("B4", manufactured by Nippon Soda Co., Ltd.) as a titanium alkoxide and acetylacetone as an additive forming a ultraviolet absorbing chelate into a mixed solvent consisting of n-butanol and isopropyl alcohol, and by mixing the obtained liquid for 10 minutes with a stirrer. Contents of the tetra-n-butoxy titanium tetramer, acetylacetone, n-butanol, and isopropyl alcohol were 6.75 mass %, 3.38 mass %, 59.87 mass %, and 30.00 mass %, respectively.

(Lamination of Layers)

As the transparent polymer film, a polyethyleneterephthalate film having a thickness of 50 μm and having easy adhesion layers on the both sides thereof ("COSMOSHINE (registered trademark) A4300" manufactured by Toyobo Co., Ltd.) (referred to as "PET film" in the following) was used. On one of the easy adhesion layers formed on both sides of the PET film, a $TiO_2$ layer as the first layer was formed by the following steps.

Specifically, the coating liquid was continuously applied on one side of the PET film using a micro-gravure coater with gravure rolls each having a predetermined groove volume.

Next, with an inline drying furnace, the coating film was dried for 80 seconds at a temperature of 100° C., to obtain a precursor layer for a TiO$_2$ layer. Next, using an inline ultraviolet irradiation equipment [a high-pressure mercury lamp (160 W/cm)], the precursor layer was continuously irradiated with ultraviolet rays for 1.5 seconds at a same line speed as during the coating process described above. Thus, a TiO$_2$ layer (first layer) was formed on the PET film by a sol-gel method in which energy of the ultraviolet rays are used during sol-gel curing. This type of sol-gel method may be referred to as "sol-gel+UV" method in abbreviation in the following.

Next, thin films constituting the second layer were formed on the first layer. To be specific, a lower-side Ti layer was formed on the TiO$_2$ layer as the first layer by sputtering with a DC magnetron sputtering equipment. Next, an Ag—Cu alloy layer was formed on the lower-side metallic Ti layer by sputtering. Next, an upper-side metallic Ti layer was formed on the Ag—Cu alloy layer by sputtering.

Conditions for formation of the upper and lower-side metallic Ti layers were as follows: purity of Ti target: 4N; ultimate pressure: $5 \times 10^{-6}$ Torr; inert gas: Ar; gas pressure: $2.5 \times 10^{-3}$ Torr; input power: 1.5 kW; and film formation time: 1.1 seconds.

Conditions for formation of the Ag—Cu layer were as follows: Cu content in Ag—Cu alloy target: 4 atom %; ultimate pressure: $5 \times 10^{-6}$ Torr; inert gas: Ar; gas pressure: $2.5 \times 10^{-3}$ Torr; input power: 1.5 kW; and film formation time: 1.1 seconds.

Next, as the third layer, a TiO$_2$ layer was formed by the "sol-gel+UV" method on the second layer. A predetermined film thickness was obtained by performing twice the film formation steps in accordance with the formation steps for the first layer.

Next, as the fourth layer, thin films constituting the fourth layer were formed on the third layer. Here, the film formation steps in accordance with the formation steps for the second layer were carried out.

However, the above described conditions during the formation of the Ag—Cu alloy layer were modified as follows: Cu content in Ag—Cu alloy target: 4 atom %; ultimate pressure: $5 \times 10^{-6}$ Torr; inert gas: Ar; gas pressure: $2.5 \times 10^{-3}$ Torr; input power: 1.8 (kW); and film formation time: 1.1 seconds, and thereby, the film thickness was changed.

Next, as the fifth layer, a TiO$_2$ layer having the same configuration as the third layer was formed by the "sol-gel+UV" method on the fourth layer.

Next, as the sixth layer, thin films having the same configuration as those of the second layer were formed on the fifth layer.

Next, as the seventh layer, a TiO$_2$ layer was formed on the sixth layer by the "sol-gel+UV" method. A predetermined film thickness was obtained by performing once the film formation steps in accordance with the formation steps for the first layer.

Thereafter, the transparent laminate film obtained via the above lamination process was subjected to a heat treatment in a heating furnace for 300 hours at a temperature of 40° C. to post-oxidize the unit of metallic Ti layer/Ag—Cu alloy layer/metallic Ti contained in the laminated layer structure (as the second, fourth, and sixth layers).

Thus, the transparent laminate film having the seven-layer laminated layer structure (with grooves) was prepared.

Refractive indices of the TiO$_2$ layers were measured with "FilmTek 3000" (manufactured by Scientific Computing International) (at a measurement wavelength of 633 nm).

Contents of the organic components in the TiO$_2$ layers were measured with x-ray photoelectron spectroscopy (XPS).

EDX analysis was performed for the thin titanium oxide layers formed by post-oxidization of the metallic Ti layers, and Ti/O ratios were obtained as follows.

To be specific, a test specimen having a thickness of 100 nm or less in a cross sectional direction of the laminated layer structure containing the titanium oxide layer (i.e., barrier layer) to be analyzed was prepared by cutting the transparent laminate film using a microtome ("ultrome V2088" manufactured by LKB). A cross section of the prepared test specimen was observed with a field emission electron microscope (HR-TEM) ("JEM2001F" manufactured by JEOL Ltd.). Next, by using an EDX equipment (with a spectral resolution of 133 eV or smaller) ("JED-2300T" manufactured by JEOL Ltd.), an electron beam was emitted from an electron gun of the EDX equipment and was made incident to a vicinity of the thickness-direction center of the titanium oxide layer (i.e., barrier layer) to be analyzed. Analysis of constituent elements of the titanium oxide layer (i.e., barrier layer) was performed by detecting and analyzing emitted characteristic x rays.

Contents of Cu as an additive element in the alloy layers were estimated as follows: under the film formation conditions, a test specimen was separately prepared by forming an Ag—Cu alloy layer on a glass substrate. The test specimen was immersed in a 6% of HNO$_3$ solution. After elution by ultra sonication for 20 minutes, the Cu content in the test specimen was estimated using the obtained sample solution by an ICP analysis method combined with a preconcentration technique.

Thickness of each of the layers was measured by cross-sectional observation of the test specimen with the field emission electron microscope (HRTEM) ("JEM2001F" manufactured by JEOL Ltd.). Widths of the grooves formed in the metal layer were measured by surface observation of the test specimen with the field emission electron microscope (HR-TEM) ("JEM2001F" manufactured by JEOL Ltd.).

Table 1 illustrates detailed laminate configuration of the transparent laminate films having the seven-layer laminated layer structures (with grooves).

TABLE 1

| | | | | Laminate configuration |
|---|---|---|---|---|
| Transparent polyer film | | | Material | PET |
| | | | Thickness | 50 μm |
| Configuration of transparent laminate layer structure | 1st layer | Metal oxide layer (Sol-gel + UV) | — | TiO$_2$ |
| | | Thickness | (nm) | 30 |
| | | Refractive Index | — | 1.85 |
| | | Content of organic component | (%) | 15 |
| | 2nd & 6th | Metal oxide layer | Post-oxidization | Titanium oxide |

TABLE 1-continued

|  |  |  |  | Laminate configuration |
|---|---|---|---|---|
| layers | Thickness | (nm) |  | 1.3 |
|  | Ti/O ratio | — |  | 1.0/1.8-1.0/1.6 |
|  | Alloy layer | Alloy type |  | Ag—Cu |
|  | Thickness | (nm) |  | 8.4 |
|  | Content of additive element | (atom %) |  | Cu: 4 |
|  | Metal oxide layer | Post-oxidization |  | Titanium oxide |
|  | Thickness | (nm) |  | 1.3 |
|  | Ti/O ratio | — |  | 1.0/1.8-1.0/1.6 |
| 3rd & 5th layers | Metal oxide layer (Sol-gel + UV) | — |  | TiO$_2$ |
|  | Thickness | (nm) |  | 74 |
|  | Refractive Index | — |  | 1.85 |
|  | Content of organic component | (%) |  | 15 |
| 4th layer | Metal oxide layer | Post-oxidization |  | Titanium oxide |
|  | Thickness | (nm) |  | 1.3 |
|  | Ti/O ratio | — |  | 1.0/1.8 to 1.0/1.6 |
|  | Alloy layer | Alloy type |  | Ag—Cu |
|  | Thickness | (nm) |  | 10 |
|  | Content of additive element | (atom %) |  | Cu: 4 |
|  | Metal oxide layer | Post-oxidization |  | Titanium oxide |
|  | Thickness | (nm) |  | 1.3 |
|  | Ti/O ratio | — |  | 1.0/1.8 to 1.0/1.6 |
| 7th layer | Metal oxide layer (Sol-gel + UV) | — |  | TiO$_2$ |
|  | Thickness | (nm) |  | 30 |
|  | Refractive Index | — |  | 1.85 |
|  | Content of organic component | (%) |  | 15 |
| Protection film |  | Material |  | Acrylic resin |
|  |  | Thickness |  | 1.5 μm |

(*) Order of a laminated layer is counted from the film side.
(*) A titanium oxide layer formed by post-oxidation of a metallic Ti layer or by reactive sputtering is included in the metal layer as a thin layer attached to an alloy layer on counting the number of the laminated layers.
(*) Thickness is estimated from weight per area.

For the laminated layer structures according to Examples 1 to 4, predetermined surface resistances were obtained by adjusting the energy of the ultraviolet rays applied during the sol-gel curing reaction. The irradiation intensities of the ultraviolet rays are shown in Table 2.

TABLE 2

| | Substrate | | UV irradiation intensity (mJ/cm$^2$) | | | |
|---|---|---|---|---|---|---|
| | Type | thickness (μm) | 1st layer | 3rd layer | 5th layer | 7th layer |
| Example 1 | A4300 | 50 | 1000 | 1200 × 2 | 1200 × 2 | 1000 |
| Example 2 | A4300 | 50 | 600 | 1200 × 2 | 1200 × 2 | 600 |
| Example 3 | A4300 | 50 | 600 | 600 × 2 | 600 × 2 | 1000 |
| Example 4 | A4300 | 50 | 600 | 600 × 2 | 600 × 2 | 600 |
| Comparative Example 1 | A4100 | 50 | 1000 | 1200 × 2 | 1200 × 2 | 1000 |

* For 3rd and 5th layers, UV irradiation was conducted twice, as the coating process was conducted twice.

3. Preparation of Laminated Glass

Each of the above obtained transparent laminate films with grooves was placed between two polyvinyl butylal films (with a thickness of 380 μm) and further between two glass plates (with a thickness of 2 mm) placed outside the polyvinyl butylal films. The obtained laminated structure was charged in an autoclave and treated under a condition of 135° C.×13 kgf/cm$^2$×20 min. to laminate the glasses. Thus, laminated glasses according to Examples 1 to 4 were prepared. On the lamination process of the glasses, division of the metal layers was promoted.

Comparative Example 1

A transparent laminate film (without grooves) according to Comparative Example 1 was prepared in the same manner as Examples except that as a transparent polymer film, a polyethyleneterephthalate film having a thickness of 50 μm and having an easy adhesion layer on one side thereof ("COSMOSHINE (registered trademark) A4100" manufactured by Toyobo Co., Ltd.) (referred to as "PET film" in the following) was used and that on a side of the PET film (i.e., the PET side) opposite to the side having the easy adhesion layer, the seven-layer laminated layer structure was formed. The laminated glass according to Comparative Example 1 was prepared by laminating glasses with the transparent laminate film according to Comparative Example 1 in the same manner as the laminated glasses according to Examples.

4. Evaluation of Transparent Laminate Films and Laminated Glasses

<Measurement of Surface Resistance>

Surface resistances of the transparent laminate films and the laminated glasses according to Examples and Comparative Example were measured with "non-contact resistivity meter Model 717H" manufactured by DELCOM. To be specific, a 160 mm square area of each of the transparent laminate films and the laminate glasses was divided into nine portions, and surface resistance was measured at nine points respectively in each divided area. The maximum, minimum, and averaged values of the surface resistance were recorded.

<Measurement of Visible Transmittance>

Visible transmittances of the laminated glasses according to Examples and Comparative Example were measured in accordance with JIS R3212.

<Measurement of Overall Sunlight Transmittance>

For evaluation of solar light shielding capabilities, overall transmittances to sunlight of the laminated glasses according to Examples and Comparative Example were measured in accordance with 15013837.

The obtained results are shown in Table 3.

TABLE 3

|  | Film alone | | | Laminated glass | | | | |
|---|---|---|---|---|---|---|---|---|
|  | Surface resistance (Ω/□) | | | Surface resistance (Ω/□) | | | Optical properties | |
|  |  |  |  |  |  |  | Visible | Overall sunlight |
|  | Ave. | Max. | Min. | Ave. | Max. | Min. | transmittance | transmittance |
| Example 1 | 99 | 124 | 81 | 9184 | 10000 | 8333 | 71% | 48% |
| Example 2 | 47 | 55 | 32 | 6429 | 7143 | 6250 | 71% | 48% |
| Example 3 | 15 | 20 | 12 | 8654 | 9091 | 8333 | 71% | 48% |
| Example 4 | 8 | 10 | 7 | 6383 | 7143 | 4762 | 71% | 48% |
| Comparative Example 1 | 4 | 4 | 3 | 329 | 621 | 170 | 71% | 48% |

According to results in Table 3, by forming grooves in the laminated layer structure of the transparent laminate film, the surface resistance is significantly increased on formation of the laminated glass and, in other words, it is found that the radio wave transparences are improved. In particular, it is found that when the transparent laminate film with grooves in the laminated layer structure has a surface resistance of 10Ω/□ or larger, the surface resistance of the laminated glass can be increased to a value much larger than 1000Ω/□, which provides a practical radio wave transparency.

Since the transparent laminate film according to the preferred embodiment of the present invention comprises the laminated layer structure in which the metal oxide layers containing the organic components and the metal layers are laminated, and since the widths of the grooves are 30 μm or less, the laminate film has an excellent appearance due to low visibility of the grooves as well as excellent radiation shielding capability and visible light transparence.

The foregoing description of the preferred embodiments of the present invention has been presented for purposes of illustration and description; however, it is not intended to be exhaustive or to limit the present invention to the precise form disclosed, and modifications and variations are possible as long as they do not deviate from the principles of the present invention.

The invention claimed is:

1. A method for producing a heat insulating laminate structure, comprising:
    placing a transparent laminate film between two transparent substrates, the transparent laminate film having on at least one side of a transparent polymer film a laminated layer structure in which a metal oxide layer containing an organic component and a metal layer are laminated and groves having widths of 30 μm or less are formed with dividing the metal layer;
    bonding the two substrates to each other through the transparent laminate film under application of a pressure; and
    promoting division of the metal layer in the transparent laminate film by the applied pressure to increase an overall surface resistance;
    wherein formation of the grooves is performed by causing a starting material for formation of the metal oxide layer containing the organic component to react and by forming cracks due to a stress generated in the laminated layer structure during the reaction.

2. The method according to claim 1, wherein the organic component is a remaining component of a starting material for a sol-gel method, and the formation of the grooves comprises a step of applying energy to the laminated layer structure from a surface thereof in an atmosphere containing one or more species selected from oxygen, ozone, and water.

3. The method according to claim 1, wherein the metal oxide layer containing the organic component is formed by a sol-gel method in which light energy is used during a sol-gel curing reaction.

4. The method according to claim 1, wherein a barrier layer composed mainly of a metal oxide is formed on at least one side of the metal layer.

5. The method according to claim 4, wherein the metal oxide layer is a titanium oxide layer.

6. The method according to claim 5, wherein the barrier layer is composed mainly of titanium oxide.

7. The method according to claim 6, wherein the formation of the barrier layer is performed by post-oxidization of a metallic titanium layer or by post-oxidization of a partially oxidized titanium layer.

8. The method according to claim 4, wherein the barrier layer is composed mainly of titanium oxide.

9. The method according to claim 8, wherein the formation of the barrier layer is performed by post-oxidization of a metallic titanium layer or by post-oxidization of a partially oxidized titanium layer.

10. The method according to claim 1, wherein the metal oxide layer is a titanium oxide layer.

11. The method according to claim 1, wherein the metal layer is a silver layer or a silver alloy layer.

* * * * *